H. N. EDENS.
TREAD ATTACHMENT FOR WHEEL RIMS.
APPLICATION FILED JULY 6, 1918.
1,311,683.
Patented July 29, 1919.
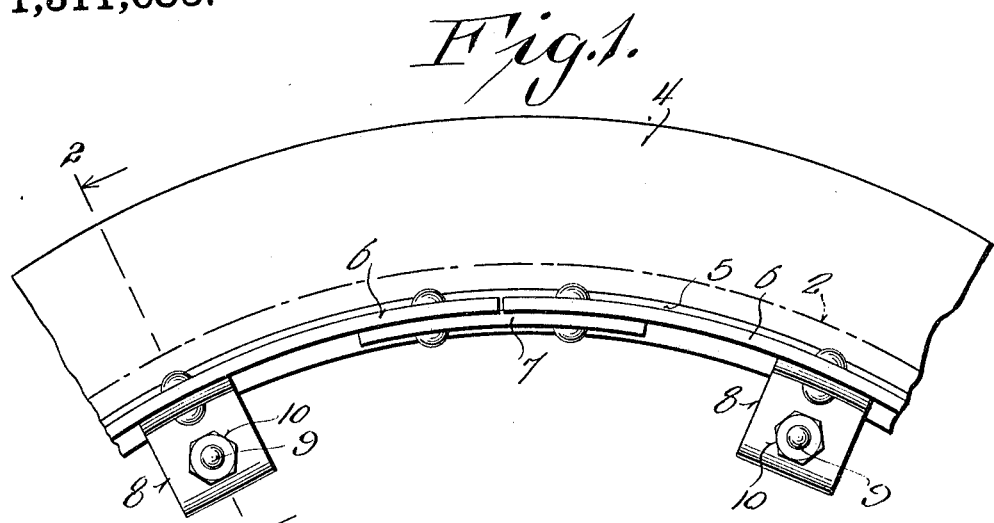
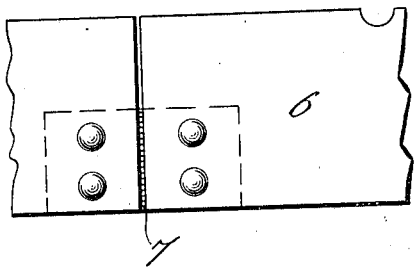
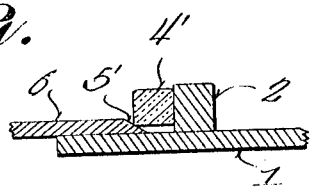
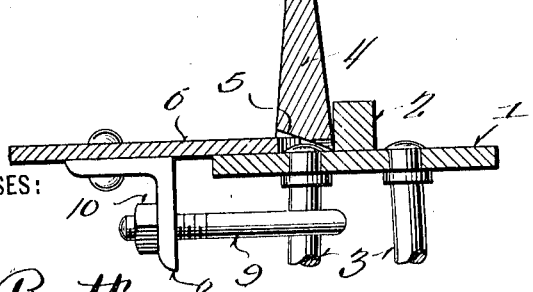
INVENTOR
Henry N. Edens
BY
ATTORNEY
WITNESSES:

UNITED STATES PATENT OFFICE.

HENRY N. EDENS, OF NEW HOLSTEIN, WISCONSIN, ASSIGNOR TO JOHN LAUSON MANUFACTURING COMPANY, OF NEW HOLSTEIN, WISCONSIN.

TREAD ATTACHMENT FOR WHEEL-RIMS.

1,311,683.

Specification of Letters Patent.

Patented July 29, 1919.

Application filed July 6, 1918. Serial No. 243,510.

*To all whom it may concern:*

Be it known that I, HENRY N. EDENS, a citizen of the United States, and resident of New Holstein, in the county of Calumet and State of Wisconsin, have invented certain new and useful Improvements in Tread Attachments for Wheel-Rims; and I do hereby declare that the following is a full, clear, and exact description thereof.

This invention relates to ground attachments for wheel rims and has primarily for its object the provision of a simple and economical detachable means for increasing the ground surface of a vehicle wheel.

A more specific object of the invention resides in the manner of attaching the traction means to the wheel.

A further object is to provide a rim extension and a tracking flange adapted to engage each other upon being attached to a rim, thereby effecting a secure grip upon the wheel rim.

With these and other objects in view, which will be apparent as the description proceeds, my invention resides in the novel features of construction, combination and arrangement of parts as hereinafter described and defined by the appended claims, it being understood that changes in the precise embodiment might be made by those skilled in the art without departing from the spirit of the invention.

This invention in one practical form in which it may be embodied is illustrated in the accompanying drawing in which:—

Figure 1 is an elevational view of a section of the wheel rim showing the invention attached thereto.

Fig. 2 is a transverse section through the rim, indicated by the line 2—2 of Fig. 1.

Fig. 3 is a detailed view of the rim extension showing the manner in which its opposite ends are connected.

Fig. 4 is a detailed view of the attaching clip, and

Fig. 5 is a transverse sectional view of a modified form of the invention.

Referring now more particularly to the accompanying drawings, 1 designates a type of wheel rim commonly used upon tractors and other forms of heavy duty vehicles. Shrunk upon the rim or otherwise suitably secured thereto, so as to form an integral part, is a tracking rib 2. The rim 1 is further provided with the ordinary supporting spokes 3.

In many instances, due to the condition of the ground, over which a tractor is compelled to work, it is desired to increase the ground surface of its wheels, and should the tractor be used in farming or hauling upon soft ground, it is further desirous to attach a tracking flange to prevent side skidding of the vehicle and insure proper tracking of the wheels.

In order to meet these requirements, the present invention has been devised in which 4 is a tracking flange adapted to encircle the rim 1 and abut the tracking rib 2. In the present instance, the inner peripheral surface 5 of the tracking flange is slightly cammed to permit the edge of a rim extension 6 to engage the same, whereby it acts as a wedge between the flange 4 and the wheel rim 1.

In the event that it is desired to attach a rim extension to the wheel, without the tracking flange, it will be readily seen that a ring 4', as shown in Fig. 5, can be provided which will not extend above the tracking rib 2.

As best shown in Fig. 3, the rim extension 6 has its opposite ends slightly spaced apart and secured together at their outer edge by a bracket 7. The ends adjacent the wedging edge of the rim are left free in order to permit that portion of the extension, disposed over the rim, to be contracted, thereby insuring a secure grip which will prevent circumferential shifting of the extension upon the rim, and relieve strain which might otherwise be thrown upon the spokes. At suitable intervals, about the extension 6, are riveted or otherwise suitably secured, brackets 8 which carry the threaded clips 9 adapted to engage the spokes 3 and provided with nuts 10.

In order to assemble the ground attachment upon a wheel rim, the flange 4 is placed over the rim and abuts the tracking rib 2. The extension is then disposed upon the rim and the clips 9 engaged with the spokes. It will be readily seen that upon turning up the nut 10 upon the clips, the extension 6 will be drawn upon the rim, and its wedging edge, which engages the cam surface 5, will be securely gripped to the rim and at the same time will form a wedge to securely lock the flange 4 against circumferential movement.

While I have shown and described the inner peripheral surface of the flange 4 as cammed, it will be understood that the same results might be accomplished by tapering or camming the wedging edge 5' of the extension 6, as shown in Fig. 5, and leaving the inner periphery of the ring 4' straight or parallel with the rim.

From the foregoing description, taken in connection with the drawings, it will be seen that an efficient and simple ground attachment has been devised, which is readily attached or detached from a rim when desired.

I claim:

1. In combination with a wheel rim, an attachment comprising a tracking flange, a rim extension adapted to form a wedge between the tracking flange and wheel rim, and means for drawing the extension upon the rim.

2. In combination with a wheel rim, an attachment comprising a tracking flange having an inner peripheral cam surface, a rim extension adapted to form a wedge between the tracking flange and wheel rim, and means for drawing the extension upon the rim.

3. In combination with a wheel rim having a tracking rib, an attachment comprising a tracking flange adapted to encircle the rim and abut the tracking rib, a rim extension adapted to form a wedge between the tracking flange and wheel rim, and means for drawing the extension upon the rim.

4. In combination with a wheel rim having a tracking rib and supporting spokes, an attachment comprising a tracking flange adapted to abut the tracking rib, said tracking flange having an inner peripheral cam surface, a rim extension adapted to form a wedge between the tracking flange and wheel rim, and means for drawing the extension upon the rim.

5. In combination with a wheel rim having a tracking rib and supporting spokes, an attachment comprising a tracking flange adapted to abut the tracking rib, said tracking flange having an inner peripheral cam surface, a rim extension adapted to form a wedge between the tracking flange and wheel rim, brackets secured to the extension, and clips carried by the brackets and engaging the wheel spokes.

6. In combination with a wheel rim, an attachment comprising a tracking flange adapted to encircle the rim, and a rim extension adapted to form a wedge between the tracking flange and rim, said extension having its opposite ends adjacent the wedging edge free and spaced apart to permit the same to be contracted upon the rim.

In testimony that I claim the foregoing I have hereunto set my hand at New Holstein, in the county of Calumet and State of Wisconsin.

H. N. EDENS.

Copies of this patent may be obtained for five cents each, by addressing the "Commissioner of Patents, Washington, D. C."